July 21, 1936.     L. UBBELOHDE     2,048,305
VISCOSIMETER
Filed July 27, 1933     2 Sheets-Sheet 1
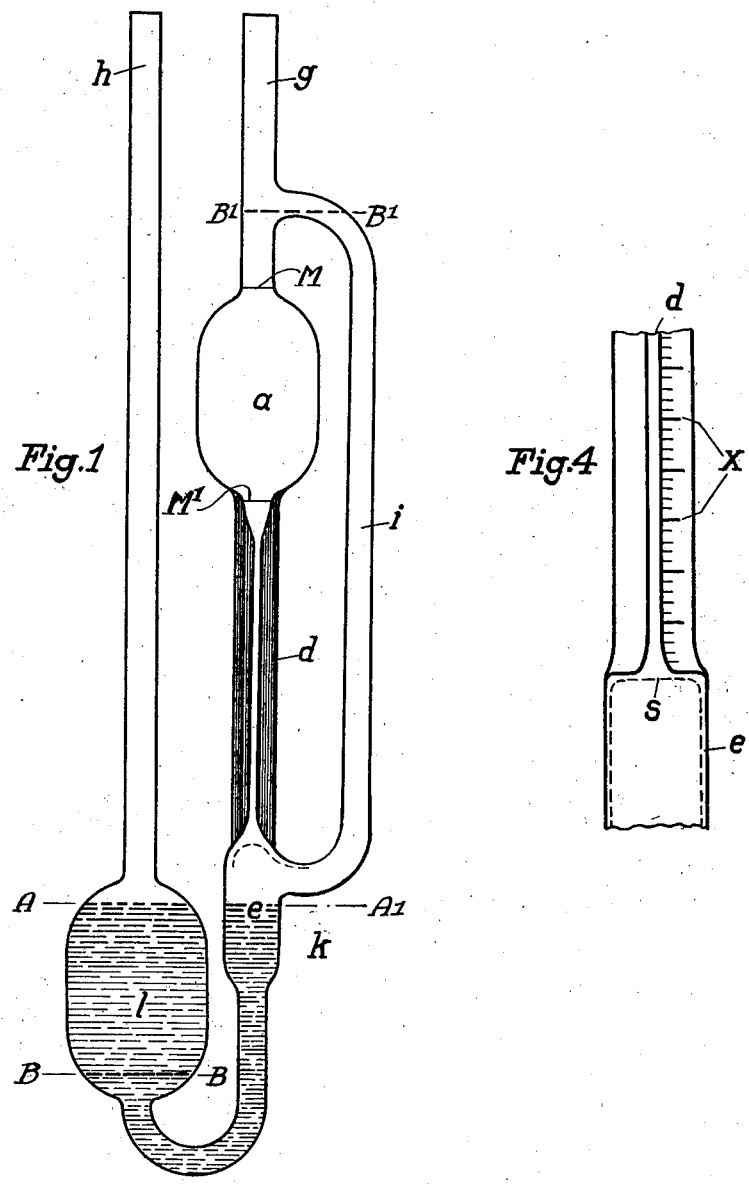
Inventor:

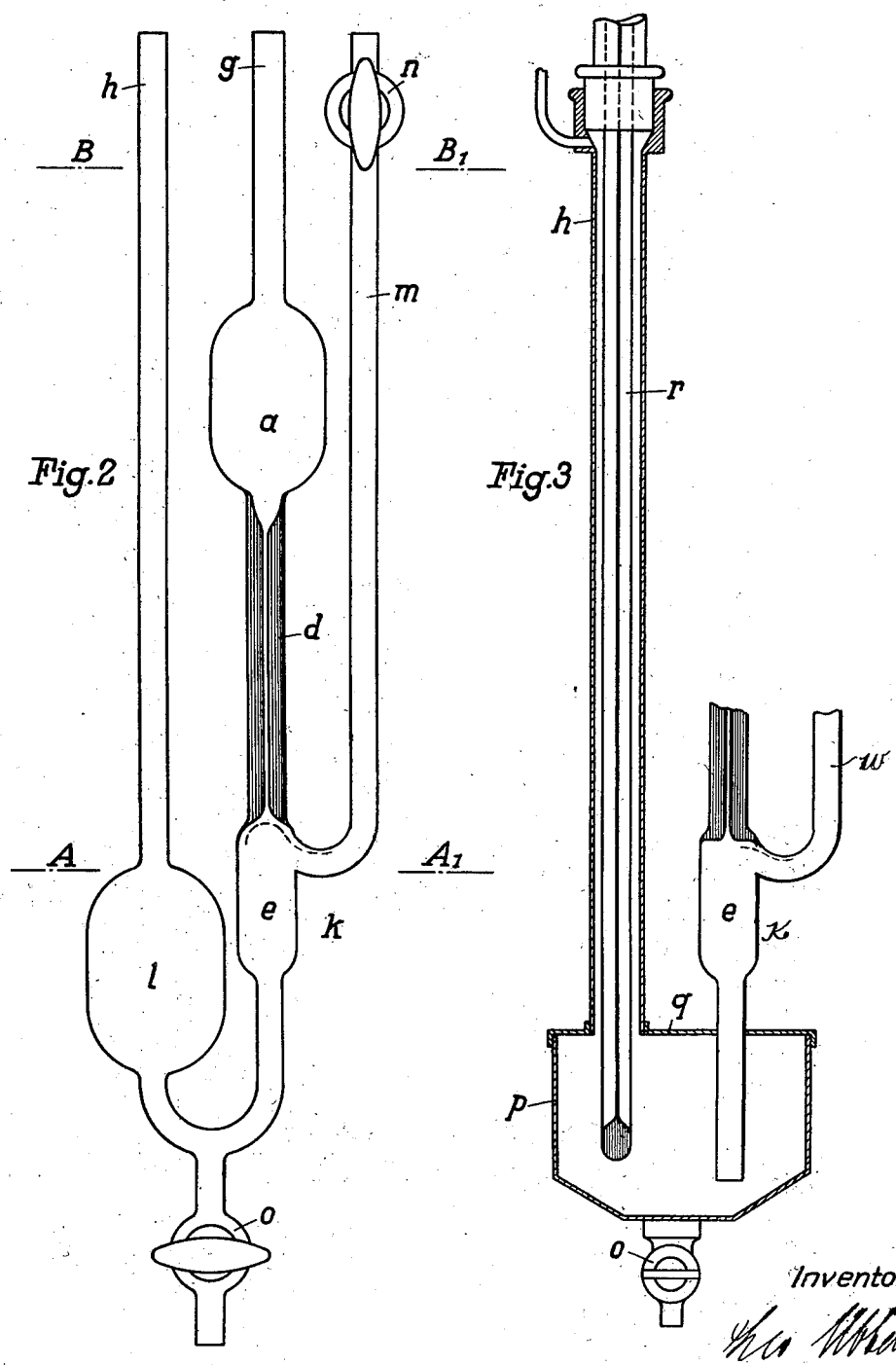

Patented July 21, 1936

2,048,305

UNITED STATES PATENT OFFICE 2,048,305

VISCOSIMETER

Leo Ubbelohde, Karlsruhe, Germany

Application July 27, 1933, Serial No. 682,539
In Germany March 24, 1932

5 Claims. (Cl. 265—11)

The invention relates to a viscosimeter which comprises a vessel which is provided with an upper and a lower mark and is connected with a vertical capillary.

According to the present invention, the capillary at its lower end runs into a wider tube which is connected with a receiving vessel at atmospheric pressure. Further the wide tube has a branch tube which also is in communication with the atmosphere.

By this or an equivalent construction of the arrangement it is attained that the liquid flowing out from the capillary does not fill the enlarged lower tube but only flows along its walls. At the junction of the capillary with the wide tube a liquid surface is formed which if the lower tube is of suitable width and shape has only a comparatively slight curvature and accordingly exerts only a small traction action. It is to be understood that "traction action" is that action which takes place in a tube whose inner surface becomes wet and in which a concave curvature develops in the surface of the liquid. The traction action develops as an immediate consequence of the surface tension of the liquid and its intensity depends upon the size of the radius of the curve of the air exposed surface of the liquid.

With liquids of very different surface tensions however, this traction action can still be so great as to have an appreciable influence.

Consequently a further development of the inventive idea is particularly advantageous in which the junction of the inner surface of the capillary with the inner surface of the wider lower tube is constituted by a horizontally disposed plane annular surface.

The capillary may be provided with a scale, the zero point of which lies in the plane of the horizontal annular surface. The scale may be calibrated in such way that it affords a measure of the surface tension of the liquid employed. The height to which the liquid rises in the capillary is different in accordance with the surface tension and can be readily ascertained in one and the same experiment. The determination of the height to which the liquid rises in the capillary enables a mathematical computation of the surface tension or else makes it possible to compensate the effect of the surface tension in the upper vessel.

According to a particularly suitable embodiment of the invention, the kinematic viscosity can be calculated directly from the measured time of flow as by timing with a stop watch.

The kinematic viscosity is calculated from the time of flow in capillary viscosimeters in accordance with the formula $$\gamma = \frac{t.\pi.g.h.r^4}{8.l.V} = \frac{m.V}{8.\pi l.t}$$

Here $\gamma$ indicates the kinematic viscosity, $g$ the acceleration due to gravity, $h$ the pressure head, $r$ the radius, $t$ the time of flow and $l$ the length of the capillary, $V$ the volume which has to flow out and $m$ is a numerical factor.

A further development of the invention therefore is to make the function precisely the same in all viscosimeters and in addition to give them precisely the same capillary diameter, the same length and the same volume or to compensate deviations in one case by deviations in another case and further to select these dimensions in such way that the constant by which the time of flow is to be multiplied is a power of 10 i. e., 1 or 0.1 or 0.01 so that the time of flow $t$ has only to be multiplied by one of the above numbers in order to determine the kinematic viscosity. According to the viscosity of the liquid, a narrow or a medium or a wide capillary is used; thus for instance for lubricating oils of high viscosity a wide capillary is used to shorten the time of the experiment, and the time of flow is multiplied with the constant of the capillary for instance with 0.01 to get the real number.

A further advantage of this arrangement also resides in that when all dimensions of the apparatus are determined in accordance with the formula, then the correction in respect of energy of motion can be precisely calculated for each of the precisely formed capillaries described above or else can be determined by experiment and a table of the following form can be prepared:

| Observed time of flow | Correction in seconds |||
| | With capillaries No. |||
| | I | II | III |
|---|---|---|---|
| 100 | 2.81 | 0.28 | 0.028 |
| 140 | 2.01 | 0.20 | 0.020 |
| 180 | 1.56 | 0.16 | |
| 250 | 1.12 | 0.11 | |
| 350 | 0.80 | 0.08 | |
| 450 | 0.62 | 0.06 | |

The invention will now be explained with reference to the accompanying drawings.

Fig. 1 shows a viscosimeter with the metering vessel $a$ provided with an upper gauge mark M and a lower gauge mark $M_1$ and the vertical capillary $d$. At its lower end the capillary runs into the enlarged outflow tube $e$ which has its upper and lower ends of segmento-spherical shape and terminates in the receiving vessel $l$. The vessel $l$ is in communication with the atmosphere by means of the tube $h$. The enlarged outflow tube $e$ has a branch tube $i$ which communicates with the atmosphere by way of the tube $g$ connected at the upper end of the metering vessel $a$. It is of advantage to connect the tube $i$ to tube $g$, as shown in Fig. 1, in that no valve is required in pipe $i$ and that the chamber $a$ can be filled with liquid through mere slow suction. This is in distinction to the form shown in Fig. 2 in which the valve $n$ must be closed to fill the chamber $a$.

The mode of operation of the arrangement is as follows:

The arrangement is filled up to the level A—A$^1$. Then by suction at $g$ (or by applying pressure at $h$) the liquid is drawn up in the pipette $a$ until its surface is at the level B$^1$. If now the suction at $g$ is stopped, then the liquid begins to flow back. As the tube $i$ is wider than the capillary $d$ it empties at once and air passes into the wide tube $e$ at the junction point $k$. In this way a concave surface forms beneath the capillary as shown in dotted lines. When the liquid surface reaches the upper mark M of the pipette $a$, a stop watch is started. The watch is stopped when the liquid surface reaches the lower mark M$_1$. In this manner, the time of flow is determined. From this time, the kinematic viscosity can be calculated with the above mentioned formula.

After the first experiment has been completed the experiment can be repeated directly after the liquid has been drawn into the vessel $a$ as before. A thermometer can be inserted in the tube $h$ to extend down into the vessel $l$.

If on drawing up the liquid it is desired to fill only the pipette $a$ but not the tube $i$ as well, then the apparatus of Fig. 2 is used in which the tube $i$ is replaced by the tube $m$. If now on drawing up the liquid such as oil the tube $m$ is closed (for example by means of a valve $n$) then only a little oil passes into the tube $m$. Before beginning the flow experiment, the valve $n$ must first be opened so that air passes through $m$ by way of $k$ to $e$.

The oil or other liquid can be changed more easily if a valve $o$ is provided beneath the vessel $l$ as shown in Fig. 2.

The mode of operation with this apparatus is as follows: The lower tap $o$ is opened and the upper tap $n$ is closed. Then the liquid to be tested, is sucked into the lower part of the apparatus up to the level A—A$_1$, for instance by closing the upper end of the tube $g$ with a finger and applying suction to the tube $h$. Then, the lower tap is closed and suction is applied to tube $g$ until the liquid has risen to the level B$_1$. Then the upper end of tube $g$ is closed by a finger and tap $n$ is opened, whereupon the vessel $e$ or the upper part of it empties at once. Then the upper end of the tube $g$ is opened, and the liquid flows downwards and reaches the upper mark M and after a certain time the lower mark M$_1$. This time of flow is determined by the use of a stop watch. The operation may be repeated in the same manner.

Fig. 3 shows a metal vessel $p$ with cover $q$ in place of the vessel $l$; the tube $h$ is screwed to the cover $q$ and serves for receiving the thermometer $r$. This apparatus is operated in the same manner as the apparatus disclosed in Figure 2.

In Fig. 4 the capillary $d$ terminates in a horizontal annular surface. When air passes in to the enlarged outflow tube $e$, then a plane liquid surface $s$ extending parallel to the horizontal annular surface is formed which is completely plane even in the centre and exerts no traction or pressure action whatever with respect to the capillary. In that this plane downwardly directed liquid surface exerts no pressure or traction effect whatever, it is also possible with this apparatus to determine the surface tension from the height to which the liquid rises in the capillary. It is to be noted that the surface tension of the liquid is the reason why the capillary does not become entirely empty. A certain portion of the capillary remains filled with the liquid. The greater the surface tension the greater will be the quantity of liquid which stays in the capillary and the higher will be the upper liquid-level. This makes it possible to provide the capillary with a scale from which the surface tension can likewise immediately be read off and taken into consideration for purposes of correction. For this purpose a scale $x$ is provided on the capillary $d$ with its zero point in the plane of the horizontal annular surface. According to the surface tension a certain quantity of liquid will remain in the capillary after the determination of the flow and this quantity may be read on the scale.

Having now particularly described and ascertained the nature of my said invention and in what manner the same is to be performed, I declare that what I claim is:—

1. A viscosimeter comprising a vessel provided with two marks, a vertical capillary connected with the lower end of said vessel and terminating in a widened outflow, the junction of said capillary and said widened outflow being formed by a plane horizontally disposed annular surface and a branch pipe connected with the widened outflow and terminating in the open air.

2. A device of the kind described comprising a vessel open at the upper end and provided with two marks, a vertical capillary connected with the lower end of said vessel and terminating in a widened outflow, a horizontal annular plane at the junction of said capillary with said widened outflow, a scale on said capillary with its zero point in the annular plane, and a branch pipe connected with the widened outflow and terminating in the open air.

3. A viscosimeter comprising a vessel open at the upper end and provided with two marks, a vertical capillary connected with the lower end of said vessel and terminating in a widened outflow, a horizontal annular plane at the junction of said capillary with said widened outflow, the volume between two marks of the vessel and the capillary being so dimensioned that the kinematic viscosity can be calculated by multiplying the time of flow between the two marks of the vessel, with a predetermined power of 10.

4. viscosimeter comprising a vessel open at the upper end and provided with two marks, a vertical capillary connected with the lower end of said vessel and terminating in a widened outflow, a horizontal annular plane at the junction of said capillary with said widened outflow, the volume between two marks of the vessel and the capillary being so dimensioned that the kinematic viscosity can be calculated by multiplying the observed time in seconds of the flow between the two marks of the vessel, with a predetermined power of 10, and a branch pipe connected with the widened outflow and terminating in the open air.

5. A viscosimeter comprising a transparent vessel provided with an upper and a lower means for indicating the level of liquid therein, a vertical capillary connected with the lower portion of said vessel and terminating in a widened outflow tube, said elements being so connected as to permit liquid to be drawn up through said outflow tube and capillary into said transparent vessel, and a branch pipe connected with the outflow tube above the lower discharge thereof and opening to the atmosphere at a higher level than the transparent vessel.

LEO UBBELOHDE.